United States Patent
Xue

(10) Patent No.: US 9,303,297 B2
(45) Date of Patent: Apr. 5, 2016

(54) HEAT TREATMENT METHOD OF PIN FOR ENDLESS TRACK

(75) Inventor: Weidong Xue, Chigaski (JP)

(73) Assignee: TOPY KOGYO KABUSHIKI KAISHA, Tokyo (JP)

( * ) Notice: Subject to any disclaimer, the term of this patent is extended or adjusted under 35 U.S.C. 154(b) by 742 days.

(21) Appl. No.: 12/741,556

(22) PCT Filed: Oct. 30, 2008

(86) PCT No.: PCT/JP2008/069724
§ 371 (c)(1),
(2), (4) Date: May 5, 2010

(87) PCT Pub. No.: WO2009/063753
PCT Pub. Date: May 22, 2009

(65) Prior Publication Data
US 2010/0252150 A1 Oct. 7, 2010

(30) Foreign Application Priority Data

Nov. 12, 2007 (JP) ................................. 2007-292719
Sep. 8, 2008 (JP) ................................. 2008-229218
Oct. 7, 2008 (JP) ................................. 2008-260347
Oct. 7, 2008 (JP) ................................. 2008-260352

(51) Int. Cl.
*C21D 1/42* (2006.01)
*C21D 9/00* (2006.01)
(Continued)

(52) U.S. Cl.
CPC ............ *C21D 9/0068* (2013.01); *B62D 55/211* (2013.01); *C21D 1/06* (2013.01);
(Continued)

(58) Field of Classification Search
CPC .............. C21D 1/06; C21D 1/10; C21D 1/18; C21D 1/42; C21D 2211/008
USPC ................................................ 148/567, 663
See application file for complete search history.

(56) References Cited

U.S. PATENT DOCUMENTS

| 6,179,936 B1 | 1/2001 | Yoshida et al. |
| 6,402,862 B1 | 6/2002 | Anderton et al. ............. 148/570 |
| 2005/0257860 A1 | 11/2005 | Takayama ..................... 148/572 |

FOREIGN PATENT DOCUMENTS

| EP | 0 933 437 A2 | 8/1999 |
| JP | 04-052247 A | 2/1992 |

(Continued)

OTHER PUBLICATIONS

International Search Report, directed to PCT/JP2008/069724, mailed on Feb. 3, 2009, 2 pages.

(Continued)

*Primary Examiner* — Kaj K Olsen
*Assistant Examiner* — Alexander Polyansky
(74) *Attorney, Agent, or Firm* — Kratz, Quintos & Hanson, LLP

(57) ABSTRACT

The present invention relates to a method for heat treatment of a columnar work. In order to provide the method for heat treatment of a columnar work being able to attain a high productivity, a reduction of cost, and an improvement of quality, as compared with the prior art, the method for heat treatment of a columnar work of the present invention includes a quench-hardening step (S1) and a tempering step (S2) being carried out after the quench-hardening step (S1), the quench-hardening step (S1) includes a first quench-hardening step (S11) and a second quench-hardening step (S12) being carried out after the first quench-hardening step (S11), the entire region of the columnar work (3) from an outer circumferential surface (31*f*) to a core thereof (32), or a partial region thereof, is heated up to a temperature not lower than a transformation temperature $Ac_3$, and then, the work is quench-hardened.

3 Claims, 8 Drawing Sheets

(51) Int. Cl.
*B62D 55/21* (2006.01)
*C21D 1/06* (2006.01)
*C21D 1/10* (2006.01)
*C21D 1/18* (2006.01)
*C21D 9/08* (2006.01)
*C22C 38/02* (2006.01)
*C22C 38/04* (2006.01)
*C22C 38/22* (2006.01)
*C21D 1/00* (2006.01)

(52) U.S. Cl.
CPC . *C21D 1/10* (2013.01); *C21D 1/18* (2013.01); *C21D 1/42* (2013.01); *C21D 9/0075* (2013.01); *C21D 9/0093* (2013.01); *C21D 9/08* (2013.01); *C22C 38/02* (2013.01); *C22C 38/04* (2013.01); *C22C 38/22* (2013.01); *C21D 2211/008* (2013.01); *Y02P 10/253* (2015.11)

(56) References Cited

FOREIGN PATENT DOCUMENTS

| JP | 07-118791 A | 5/1995 |
| JP | 10-096010 A | 4/1998 |
| JP | 11-279647 A | 10/1999 |
| JP | 2000-239744 A | 9/2000 |
| JP | 2007-119825 A | 5/2007 |

OTHER PUBLICATIONS

Extended European Search Report dated Sep. 12, 2014, corresponding to EP Patent Application No. 14160659.0.

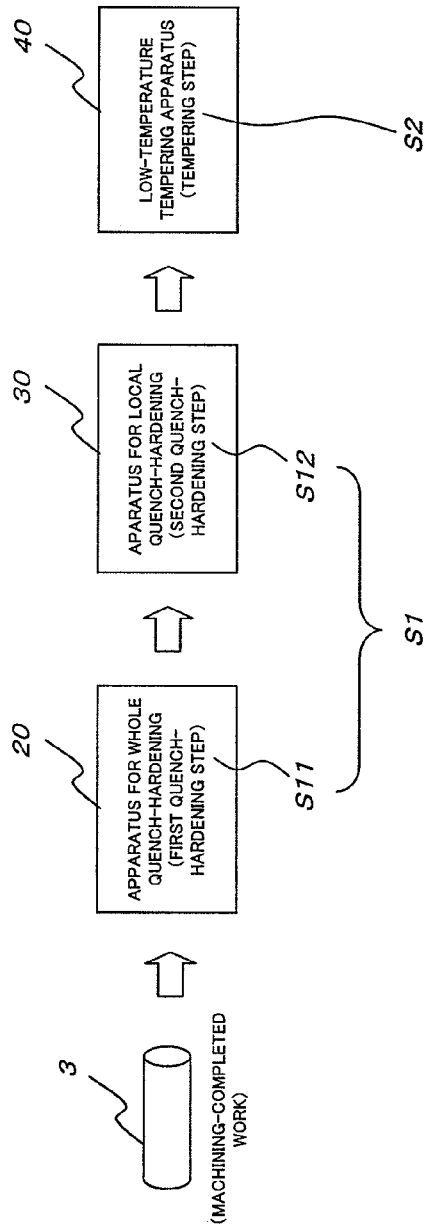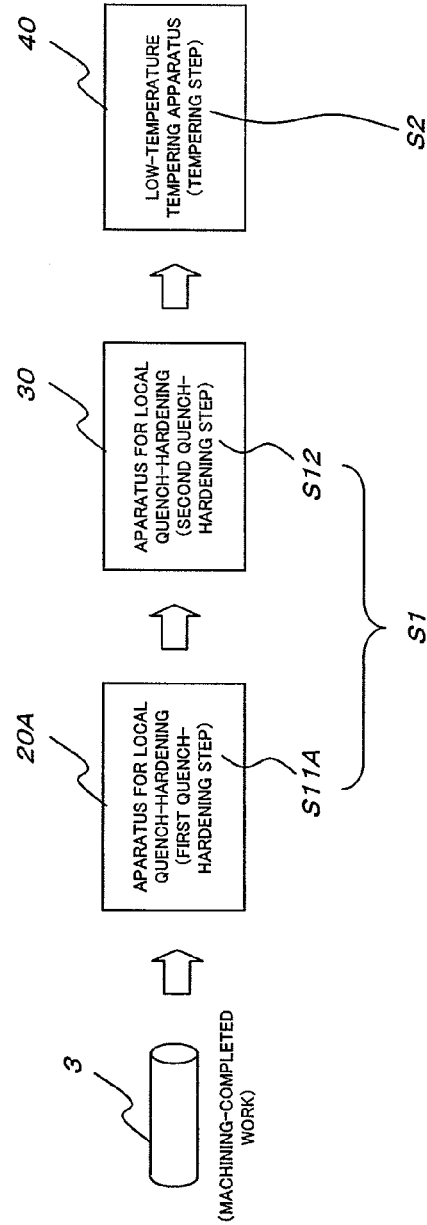

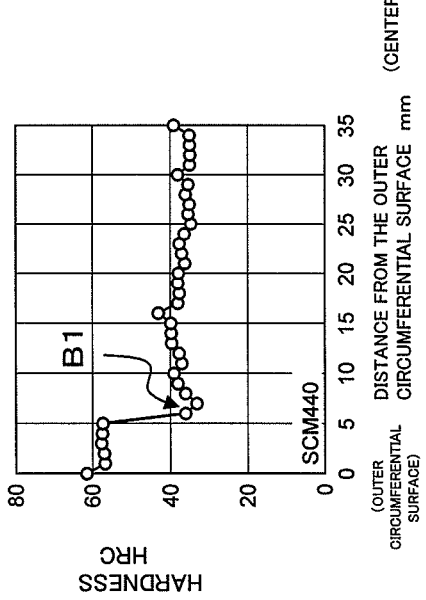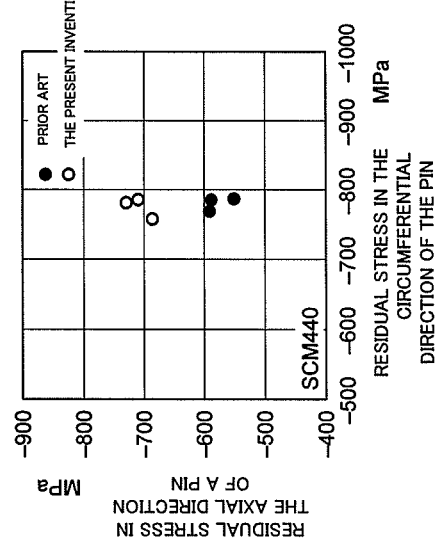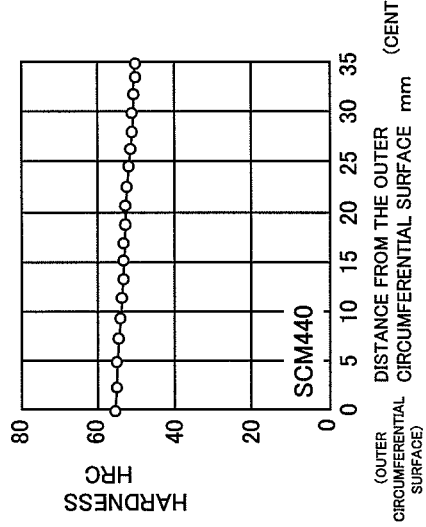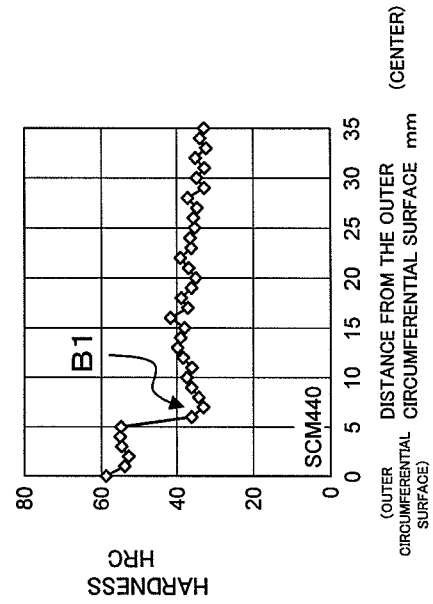
Fig.3
Fig.4
Fig.5
Fig.6

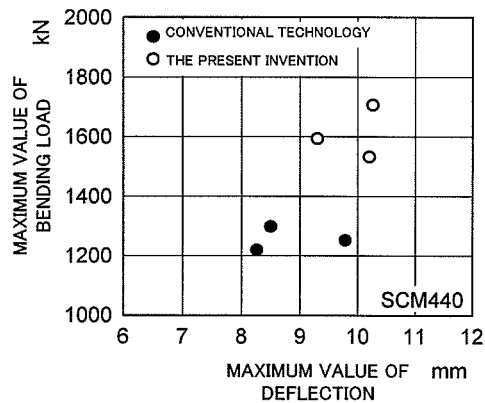
Fig.7
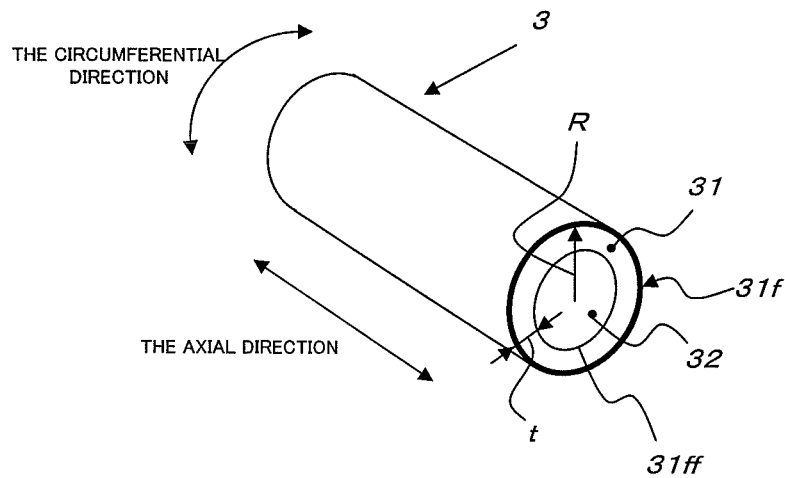
Fig.15
MATERIAL : SCM 440    LENGTH 370mm , DIAMETER 70mm
CHEMICAL COMPOSITION    (MASS %)
| C | Si | Mn | P | S | Cu | Ni | Cr | Mo | Fe |
|---|---|---|---|---|---|---|---|---|---|
| 0.38~ 0.43 | 0.15~ 0.35 | 0.60~ 0.90 | 0.030 NOT MORE THAN | 0.030 NOT MORE THAN | 0.30 NOT MORE THAN | 0.25 NOT MORE THAN | 0.90~ 1.20 | 0.15~ 0.30 | RESIDUAL |
Fig.16  Prior Art

HEAT TREATMENT METHOD OF PIN FOR ENDLESS TRACK

TECHNICAL FIELD

The present invention relates to a method for heat treatment of a columnar work, in particular, a large-sized (large-diameter) columnar work. In this connection, "a columnar work" includes a pin as a constructional part of an endless track of, for example, a construction vehicle. However, "a columnar work" is limited to neither a pin, nor a large-sized work (a pin being large in diameter, in a case that the work is a pin).

BACKGROUND ART

An endless track 10 (refer to FIG. 13) used for a construction vehicle, such as an excavator, bulldozer, and so on, comprises a pair of links 1, a shoe 2, a pin 3, and a bushing 4, as shown in FIG. 14.

In FIG. 15, a columnar work such as a pin 3 used for an endless track, in an outer circumferential surface region 31 thereof (an outer circumferential surface, and a region in the vicinity thereof), is required so as to have a strength being capable for withstanding bending stress and torsion stress, and wear resistance, on the other hand, in a core 32 thereof is required so as to have a strength and a toughness being capable for withstanding shearing stress.

Various methods being capable for matching the above-mentioned requirements have been proposed as a heat treatment method of a pin of an endless track.

There is available, for example, a method whereby a low-carbon alloy steel is used as a raw material for the pin, a method for "carburizing and quench-hardening" is carried out thereto, and then, a "low-temperature tempering" is carried out. In this method (a methods for carburizing and quench-hardening), a low-carbon alloy steel such as SCM 415, SCM 420 and so on is adopted for the raw material of the pin, and carburizing is carried out thereto so as to transfer merely an outer circumferential surface region thereof into a high-carbon alloy steel, and thereafter, a quench-hardening and a low-temperature tempering are carried out thereto.

However, in a method for carburizing and quench-hardening, in order to increase a wear resistance and a strength of a pin, it is necessary to increase a carburized case depth, and to extend a carburizing time, and thereby, there is a problem that a cost is increased. Also, there is a problem that a large quantity of a carburizing gas should be necessary, and then, a cost for the carburizing gas is increased.

Further, there is also available a method in which a medium-carbon alloy steel is used as a raw material for a pin, "a quench-hardening" is carried out thereto to be followed by application of "low temperature tempering". More specifically, in this method, a medium-carbon alloy steel containing carbon in a range of 0.3 to 0.5 mass % is adopted for the raw material, and a portion of a pin, which portion is a range from an outer circumferential surface of the pin to a core of the pin, is entirely heated to a temperature being not lower than the transformation temperature $Ac_3$ before applying rapid cooling for quench-hardening, and thereafter, the pin is carried out a low-temperature tempering.

However, in the above-mentioned prior art, since the quench-hardened layer depth of the pin is dependent on hardenability of the raw material, a diameter of the pin and so on, a necessary wear resistance and a strength will not be obtained in a case that a raw material having low hardenability is used. On the other hand, in a case that a raw material having high hardenability is used, an excessive increase in the quench-hardened layer depth of the pin will be happened, and thereby, a compressive residual stress on the outer circumferential surface of the pin will be decreased, so that there will be a problem of a decreasing a fracture toughness and a fatigue strength of the pin.

Further, as a prior art relating to a heat treatment method for a pin for an endless track, there is a method in which a medium-carbon alloy steel is used as a raw material for the pin, and the first step of thermal refining, that is, a quench-hardening is carried out thereto, "the second step of thermal refining, that is, high-temperature tempering" is carried out thereto, an "high-frequency induction hardening of the outer circumferential surface region of the pin" is carried out thereto, and finally, "low-temperature tempering" is carried out thereto. More specifically, in such the method, a medium-carbon alloy steel containing carbon in a range of 0.3 to 0.5 mass % is a raw material of the pin, a portion of the pin, which portion is a range from an outer circumferential surface of the pin to a core of the pin, is entirely heated to a temperature being not lower than the transformation point $Ac_3$ before applying the rapid cooling for quench-hardening, and thereafter, the pin is carried out a high-temperature tempering entirely in the range being from the outer circumferential surface to the core thereof, thereby a microstructure of the pin is entirely transfer to a sorbite structure. Thereafter, the high-frequency induction hardening is carried out to the outer circumferential surface region of the pin, and the low-temperature tempering is carried out thereto.

Herein, two steps of "the first step of thermal refining, that is, a quench-hardening" and "the second step of thermal refining, that is, high-temperature tempering" are combined, such the combined steps are so-called "thermal refining (a process step)". Heat treatment is carried out to a large-sized pin (a pin having a large diameter: a pin as large as 50 mm or more in diameter) by carrying out such the method.

In FIG. 16, a table of chemical composition (mass %) of SCM 440 being as an example of the medium-carbon alloy steel is shown. A pin made of SCM 440 is described as "pin A" hereinafter. The pin A is 370 mm in length and 70 mm in diameter.

FIGS. 17 to 20 show hardness distribution (hardness distribution from the outer circumferential surface of the pin A to the center thereof) in a cross section of the pin A, in respective steps of a heat treatment in the prior art, in which "the first step of thermal refining, that is, a quench-hardening", "the second step of thermal refining, that is, high-temperature tempering, the high-frequency induction hardening", and "the low-temperature tempering" are carried on. In FIGS. 17 to 20, respectively, the horizontal axis indicates a distance from the outer circumferential surface of the pin A, and the vertical axis indicates Rockwell hardness.

FIG. 17 shows hardness distribution after the step of the first step of thermal refining, that is, a quench-hardening. As shown in FIG. 17, a hardness of the outer circumferential surface region of the pin, which region is in, and near the vicinity of the outer circumferential surface, is on the order of HRC 55 after the step of "the first step of thermal refining, that is, a quench-hardening". On the other hand, a hardness of the core (a region in and near the core of the pin: a region of a predetermined distance from the center of the pin) is on the order of HRC 50.

FIG. 18 shows hardness distribution after the step of "the second step of thermal refining, that is, high-temperature tempering". As shown in FIG. 18, a hardness of the outer circumferential surface region of the pin decreases to the order of HRC 40, after the high-temperature tempering. On the other hand, a hardness of the core including the center of the pin is on the order of HRC 30.

FIG. 19 shows a hardness distribution after the step of a high-frequency induction hardening. In FIG. 19, a hardness of the outer circumferential surface region of the pin A increases to the order of HRC 60, due to the high-frequency induction hardening. A hardness of the core of the pin is still a value around HRC 30. Further, there is a region B2 between the outer circumferential surface region of the pin and the core thereof, in which region a hardness decreases sharply.

FIG. 20 shows a hardness distribution after the step of low-temperature tempering. As shown in FIG. 20, a hardness of the outer circumferential surface region decreases slightly to the order of HRC 55, due to the low-temperature tempering.

In the above-mentioned prior art, in which steps of "the first step of thermal refining, that is, a quench-hardening", "the second step of thermal refining, that is, high-temperature tempering", the high-frequency induction hardening, and the low-temperature tempering are carried out, since four steps should be carried out, there is a problem that a lead time will be longer, and thereby, a entire processing time will be longer.

Further, in order to ensure necessary hardness of the core (hardness of the core portion), it is necessary to use a raw material having high hardenability. However, since such the raw material is expensive, a cost will be increased.

In addition, in case that the necessary hardness of the core (hardness of the core portion) cannot be obtained, there is a possibility that the pin is broken upon being imposed an excessive shearing stress thereon.

Further, as another prior art, a heat treatment method is proposed in which a high-frequency induction hardening is carried out twice to a steel raw material of pre-determined composition (refer to Patent Document 1).

However, in the above-mentioned prior art (Patent Document 1), there is a problem that a depth of the secondary quench-hardened layer is on the order of 0.5 mm to 0.7 mm, and then, a satisfactory wear resistance being required for a pin for an endless track cannot be embodied.

[Patent Document 1] JP-A-H07(1995)-118791

DISCLOSURE OF THE INVENTION

Problems to be Solved by the Invention

The present invention has been proposed in order to solve the above-mentioned problems in the prior art, and it is an object of the present invention to provide a method for heat treatment of a columnar work, especially, a columnar work having a large diameter, which method is capable of a high productivity, a reduction in cost, and an improvement in quality, as compared with the prior art method.

Means for Solving the Problems

According to a method for heat treatment of a columnar work of the present invention, in which a melhod for heat treatment of a columnar work (3: a pin) being made of a medium-carbon alloy steel is carried out. the method is characterized in that a quench-hardening step (Si) and a tempering step (S2) being carried out after the quench-hardening step (S1) are included, the quench-hardening step (S1) includes a first quench-hardening step (S11) and a second quench-hardening step (S12) being carried out after the first quench-hardening step (S11), the first quench-hardening step (S11) is a quench-hardening step in which the entire region of the columnar work (3) being from an outer circumferential surface (31f) to a core thereof (32) is heated to a temperature not lower than a transformation temperature $Ac_3$, the second quench-hardening step (S12) is a quench-hardening step in which the outer circumferential surface region (31) of the columnar work (3) being carried out by the quench-hardening in the first quench-hardening step (S11) is merely heated by an induction heating to a temperature not lower than the transformation temperature $Ac_3$, and that the tempering step (S2) is a step for low-temperature tempering the columnar work (3) carried out by the quench-hardening in the quench-hardening step (S1).

Herein, the phrase "the outer circumferential surface region (31)" in the second quench-hardening step (S12) means to a region including not only the outer circumferential surface (31f) of the columnar work (3) but also a pre-determined region being inward from the outer circumferential surface (31f) in the radial direction (in a depth direction) of the columnar work (3). In other words, a region, which is inward from the outer circumferential surface (31f) in the radial direction of the columnar work (3), by a depth of a layer having a hardness not less than the effective hardness (t), is a meaning of the phrase "the outer circumferential surface region (31)".

The phrase "a depth of the layer having a hardness not less than the effective hardness (t)" means a thickness (depth: a dimension in the radial direction) of "the layer having a hardness not less than the effective hardness", and means a distance from "the outer circumferential surface 31f" of the columnar work (3) to "a position having the effective hardness" (31ff).

"The layer having a hardness not less than the effective hardness" is a region (range) the hardness of which is not less than an effective hardness after the second quench-hardening step. "The effective hardness" means a hardness of a material being deemed to be quench-hardened and in the present specification, "a hardness of 80% martensite (HRC 45)" is deemed to be "the effective hardness".

"The position having the effective hardness 31ff" is a position (or a depth from the outer circumferential surface 31f), a hardness of which position (or depth) corresponds to "the effective hardness (HRC 45)".

"The depth of the layer having a hardness not less than the effective hardness" (t) is preferably not less than 3 mm in order to ensure the necessary wear resistance.

Also, according to a method for heat treatment of a columnar work of the present invention, in which a method for heat treatment of a columnar work (3: a pin) being made of a medium-carbon alloy steel is carried out, the method is characterized in that, a quench-hardening step (S1) and a tempering step (S2) being carried out after the quench-hardening step (S1) are included, the quench-hardening step (S1) includes a first quench-hardening step (S11A) and a second quench-hardening step (S12) being carried out after the first quench-hardening step (S11A), the first quench-hardening step (S11A) is a quench-hardening step in which a partial region of the columnar work (3) being from an outer circumferential surface (31f) to a core (32) is heated to a temperature not lower than a transformation temperature $Ac_3$, the second quench-hardening step (S12) is a quench-hardening step in which the outer circumferential surface region (31) of the columnar work (3) carried out by the quench-hardening in the first quench-hardening step (S11A) is merely heated by an induction heating to a temperature not lower than the transformation temperature $Ac_3$, and that, the tempering step (S2) is a step for low-temperature tempering to the columnar work (3) carried out by the quench-hardening in the quench-hardening step (S1).

Herein, preferably, heating in the first quench-hardening step (S11, S11A) is an induction heating.

Alternatively, the heating in the first quench-hardening step (S11, S11A) is preferably a heating within a furnace.

Also, in the second quench-hardening step (S12), a depth of the outer circumferential surface region (31) (t: the depth of the layer having a hardness not less than the effective hardness) is preferably not less than 1/10 of a tadius (R) of the columnar work (3), and not more than 1/2 of the radius (R) of the columnar work (3).

That is, preferably, $1/10 \leq t/R \leq 1/2$

Further, in the present invention, a dimension (rr) of ihe partial region of the columnar work (3), in the radial direction thereof, which region is healed in the first quench-hardening step (S11A: the first quench-hardening step), is preferably not less than 1/3 of the radius (R) of the columnar work (3), and not more than 3/4 of the radius (R) of the columnar work (3).

That is, preferably, $1/3 \leq rr/R \leq 3/4$

In the present invention, the columnar work (3) is preferably a pin for an endless track.

Furthermore, the columnar work (3) is preferably not less than 50 mm in a diameter thereof. However, it is possible to apply the present invention for a columnar work (3) being less than 50 mm in a diameter thereof.

Effects of the Invention

In the prior art, four steps are necessary for a heat treatment of a columnar work. By means of the present invention including the above-mentioned constitutions, number of steps being required for the heat treatment of the columnar work (3) are reduced to three steps, and therefore, a productivity is improved and manufacturing costs are reduced.

Further, since the outer circumferential surface region (31) of the columnar work (3) is merely quench-hardened in the second quench-hardening step (S12), a high compressive residual stress is generated on the outer circumferential surface region (31), thereby the fatigue strength of the columnar work (3) is improved.

In addition, since a hardness of an region near a position, at which the maximum shearing stress in cross-section of the pin is generated, is increased as compared with one in the prior art, it is possible to prevent fracture even if an excessive shearing stress is imposed thereon. Accordingly, it is not necessary to use a raw material having high hardenabilily for securing a required hardness of the core portion, so that a raw material with less addition (in amounts) of alloy elements can be used as a raw material to be carried out, and cost for buying raw materials can be reduced.

Here, in the present invention, in a case that the partial region of the columnar work (3) being from the outer circumferential surface (31f) to the core (32) is heated to the temperature not lower than the transformation temperature $Ac_3$ and then the work (3) is quench-hardened in the first quench-hardening step (S11A), in such the case the entire region of the cross section of the columnar work (3) is not heated to the temperature not lower than the transformation temperature $Ac_3$, since it is not necessary to heat the entire region of the cross section of the columnar work (3) to the temperature not lower than the transformation temperature $Ac_3$, a heating time in the first quench-hardening step (S11A) can be shortened.

As a result, energy consumed amount for heating in the first quench-hardening step (S11A) can be reduced.

In the present invention, in a case that an induction heating is carried out for heating in the first quench-hardening step (S11), it is possible to carry out the quench-hardening step (S1) in a continuous manner.

On the other hand, if a heating within a furnace is carried out for heating in the first quench-hardening step (S11), a cost for heating in the first quench-hardening step (S11) is reduced.

Further, in the present invention, in a case that the depth (t: the depth of the layer having a hardness not less than the effective hardness) of the outer circumferential surface region (31) in the second quench-hardening step (S12) is determined to a value being not less than 1/10 of the radius (R) of the columnar work (3) and not more than 1/2 of the radius (R) of the columnar work (3), an early wear of the pin (3) being caused by a excessively small depth of the layer having a hardness not less than the effective hardness (t) will be prevented, and also, a decrease in the compressive residual stress generated on the outer circumferential surface of the pin (3) being caused by a excessively large depth of the layer having a hardness not less than the effective hardness (t) will be prevented.

Still further, in the present invention, the manufactured columnar work (3) may be, for example, a pin for an endless track, and also, it is possible to apply the present invention to a work being other than a pin for an endless track.

In addition, it is recommended to apply the present invention to a pin (3) for an endless track, a diameter of which pin is not less than 50 mm. However, the present invention can also be carried out to a pin (3) for an endless track, a diameter of which pin is less than 50 mm in diameter.

PREFERRED EMBODIMENTS OF THE INVENTION

Preferred embodiments of the present invention are described hereinafter with reference to the accompanying drawings. In order to explain about an embodiment of a method for heat treatment of a columnar work according to the present invention, a pin as a constructional part of an endless track 10 (refer to FIG. 13) for use in, for example, construction vehicle, such as an excavator, bulldozer, and so on, is cited hereunder for explanation as an example of the columnar work. It is to be understood, however, that the columnar work is not limited to a pin for use in the endless track (hereinafter referred to also as "a pin").

In the method according to the present invention, a large-sized pin having a diameter not less than 50 mm is cited by way of example, however, the method for heat treatment of a columnar work, according to the present invention, is also applicable to a small-sized pin, and a medium-sized pin, as well. Herein, the small-sized pin refers to one less than 30 mm in diameter while the medium-sized pin refers to one having a diameter in a range of 30 to 50 mm, and the large-sized pin refers to one not less than 50 mm in diameter.

As described in the foregoing, the endless track 10 (refer to FIG. 13) of the construction vehicle is made up of units linked with each other in succession, the units each being comprised of a pair of links 1, a track shoe 2, a pin 3, and a bushing 4, as shown in FIG. 14.

And in a pin 3 for use in the endless track (refer to FIG. 15), strength for withstanding bending stress, and torsional stress, and wear resistance, in other words, hardness is required of an outer circumferential surface region (within a range t in depth from an outer circumferential surface 31f to the layer having a hardness not less than the effective hardness position 31*f*) 31 of the pin 3. On the other hand, strength for withstanding shearing stress, and toughness are required of a core (a portion of the pin 3, other than the outer circumferential surface region 31) 32 of the pin 3.

In the method according to the present invention, heat treatment is carried out to a raw material formed of a medium-carbon alloy steel in order to acquire the hardness required of the outer circumferential surface region 31, and the shear strength and the toughness, required of the core 32, by application of the heat treatment.

Herein, the medium-carbon alloy steel refers to a medium-carbon steel with alloy elements, such as Mn, B, Cr, Mo, Ni, and so on, added thereto. The purpose for addition of those alloy elements is to improve a hardenability, a wear resistance, a toughness, and so on. Further, the medium-carbon steel refers to steel containing carbon in a range of 0.30 to 0.50 mass % In this connection, a low-carbon steel refers to a steel containing less than 0.30 mass % of carbon, and a high-carbon steel refers to a steel containing carbon in excess of 0.50 mass %.

The method according to a first embodiment of the present invention is described hereinafter with reference to FIGS. 1 to 7.

In the method according to the first embodiment, the large-sized pin 3 is manufactured according to steps of a flow sheet shown in FIG. 1, after completion of machining.

FIG. 2 shows the method according to the first embodiment of the present invention in comparison with the prior art (the prior art wherein the first step of thermal refining, that is, a quench-hardening, the second step of thermal refining, that is, high-temperature tempering, the high-frequency induction hardening, and the low temperature tempering are carried out) described with reference to FIGS. 17 to 20. More specifically, in FIG. 2, there are schematically shown metallic microstructures of the pin, in cross section, in respective steps (manufacturing processes) of the method according to the first embodiment of the present invention in comparison with metallic microstructures of the pin, in cross section, in respective steps of the method according to the prior art described with reference to FIGS. 17 to 20.

At the same time, referring to FIGS. 3 to 5, and FIGS. 17 to 20, respectively, it is intended in FIG. 2 that cross-sectional hardness distribution in the respective steps (manufacturing processes) of the method according to the first embodiment in comparison with cross-sectional hardness distribution according to the prior art described with reference to FIGS. 17 to 20.

In a step indicated by an expression "machining-completed work", shown in FIG. 1, machining, and so on are carried out to a raw material (bar steel) made up of the medium-carbon alloy steel to be thereby formed into a large-sized pin 3. The raw material of the pin 3 is SCM440, and chemical composition (mass %) thereof, as previously described, is shown in FIG. 16.

Subsequently, the pin 3 is carried into an apparatus for whole quench-hardening 20 (an apparatus for the first step of quench-hardening), in which a first quench-hardening step S11 is carried out to the pin 3. The first step of quench-hardening, that is, a quench-hardening apparatus 20 is provided with a heating means (a heating furnace or an induction heater), and a cooling unit, although not specifically shown in the figure. First, the pin 3 in its entirety (the entire region thereof, ranging from the outer circumferential surface 31*f* through the core 32, shown in FIG. 15) is heated to a temperature not lower than a transformation temperature $Ac_3$ by use of the heating means of the apparatus for whole quench-hardening 20.

Heating by the first step of quench-hardening, that is, a quench-hardening apparatus 20 (an apparatus for whole quench-hardening: an apparatus for the first step of quench-hardening) may be carried out by use of induction heating, or the heating may be carried out within the heating furnace. In the case that the heating is carried out within the heating furnace, a fossil fuel such as heavy oil, light oil, kerosene, and so on, or electricity is used as a heating source (energy).

An transformation temperature $Ac_3$ (a specific temperature) of a workpiece is dependent on chemical composition of the workpiece, and is approximately expressed by the following formula:

$$Ac_3(°C.)=908-224\times C\ (\%)+30\times Si\ (\%)-34\times Mn\ (\%)+439\times P\ (\%)-23\times Ni\ (\%)$$

In the case of the heating within the heating furnace, a transformation temperature $Ac_3$ of the medium-carbon alloy steel is on the order of approximately 800° C. (780 to 820° C.) In the case of the induction heating (rapid heating) (not shown), the transformation temperature $Ac_3$ of the medium-carbon alloy steel will be higher by about 100° C. than that in the case of the heating within the heating furnace.

In the case that the heating in the first quench-hardening step S11 is effected with the use of the induction heater, it is necessary to select frequency of an electric generator (not shown) such that the entire region of the workpiece, ranging from the outer circumferential surface 31*f* through the core 32, will be heated to a temperature not lower than the transformation temperature $Ac_3$.

In this connection, there exists a relationship between frequency f (kHz) and a heating depth d (mm) as follows:

$$d=(250/f)^{1/2}$$

It is possible to heat the entire region of the cross section of the pin 3 up to the temperature not lower than the transformation temperature $Ac_3$ by setting the frequency f as appropriate in accordance with the relationship described as above.

Upon completion of the heating of the pin 3 in its entirety up to the temperature not lower than the transformation temperature $Ac_3$ by means of a quench-hardening apparatus 20 (an apparatus for whole quench-hardening: an apparatus for the first step of quench-hardening), the heating is stopped, and then, a cooling of the pin 3 for quench-hardening is started by use of the cooling unit (not shown) of the quench-hardening apparatus 20 before the temperature of the outer circumferential surface 31*f* of the work descends to the transformation temperature $Ar_3$. In the case that the work is made of a medium-carbon alloy steel, a transformation temperature $Ar_3$ thereof will be a temperature being lower about 100° C. than the transformation temperature $Ac_3$. A coolant (cooling means) for use in quench-hardening includes water, a water-soluble coolant, oil, and so on. In consideration of a cost aspect and an environmental impact aspect, water is preferably as the coolant.

When the quench-hardening is carried out to the pin 3 by means of the quench-hardening apparatus 20 and the first quench-hardening step S11 is completed, the pin 3 is carried into a apparatus for local quench-hardening 30. The apparatus for local quench-hardening 30 is provided with an induction heater and a cooling unit, although not specifically shown in the figure. Then, a high-frequency induction hardening step (a second quench-hardening step) S12 is carried out to the pin 3.

In the high-frequency induction hardening step (the second quench-hardening step) S12, an induction heating to a temperature not lower than the transformation temperature $Ac_3$ is carried out to merely the outer circumferential surface region 31 of the pin 3 which is carried out by the quench-hardening in the first quench-hardening step S11. In other words, although the entire region of the cross section of the pin 3 is heated to the temperature not lower than the transformation temperature $Ac_3$ in the first quench-hardening step S11, only the outer circumferential surface region 31 of the pin 3 is heated to the temperature not lower than the transformation temperature $Ac_3$ in the second quench-hardening step S12.

The heating in the first quench-hardening step S11 is a heating of the pin in whole. Reversely, the heating in the second quench-hardening step S12 is a heating to merely the outer circumferential surface region 31, and therefore, the heating in the second quench-hardening step S12 is a heating of the pin in local, which is so-called "partial heating". In order to heat merely the outer circumferential surface region 31 (in order to carry out a heating of the pin in local), the heating in the second quench-hardening step S12 has to be an induction heating (heating by mean of, for example, a high-frequency induction power supply).

Now, the outer circumferential surface region 31 means to the region including not only the outer circumferential surface 31$f$ of the pin 3 but also near the outer circumferential surface 31$f$, which region has a given depth t (a depth of the layer having a hardness not less than the effective hardness), as shown in FIG. 15.

"A depth of the layer having a hardness not less than the effective hardness t" is "a thickness of the layer having a hardness not less than the effective hardness (depth: a dimension in the radial direction)", and is a distance from the outer circumferential surface 31$f$ of the columnar work 3 to the position having the effective hardness 31$ff$, in FIG. 15. Further, "the layer having a hardness not less than the effective hardness" is a region (scope), a hardness of which is not less than an effective hardness after the second quench-hardening step. "the effective hardness" means to a hardness of a work which is deemed to be hardened (quench-hardened). In the method according to the present invention, "hardness of 80% martensite (HRC 45)" is deemed "a hardness of a work which is deemed to be hardened (quench-hardened)". And "the position having the effective hardness 31$ff$" is a position a hardness of which is "the effective hardness (HRC 45)".

"The depth of the layer having a hardness not less than the effective hardness t" is preferably not less than 1/10 of the radius R of the pin 3, and not more than 1/2 of the radius R of the pin 3. That is, in case that a character "R" indicates the radius of the pin, it is preferably that "the depth of the layer having a hardness not less than the effective hardness t" from the outer circumferential surface 31$f$ of the pin 3$a$ satisfies a relationship "$R/10 \le t \le R/2$".

If "the depth of the layer having a hardness not less than the effective hardness t" is smaller than R/10, the pin 3 will be worn at an early stage. On the other hand, if "the depth of the layer having a hardness not less than the effective hardness t" is larger than R/2, a compressive residual stress generated on the outer circumferential surface of the pin 3 will be decreased, and therefore, it is not possible to attain an effect to be described hereinafter (an effect for decreasing a tensile stress imposed on the pin).

In addition, in order to ensure necessary wear resistance, "the depth of the layer having a hardness not less than the effective hardness t" is preferably not less than 3 mm.

A depth being so-called "heating depth" is determined such that "the depth of the layer having a hardness not less than the effective hardness t" satisfies the relationship $R/10 \le t \le R/2$ ("R" indicates the radius of the pin 3), that "the depth of the layer having a hardness not less than the effective hardness t" is not less than 3 mm, and that the outer circumferential surface region 31 of the pin 3 is heated to the temperature not lower than the transformation temperature $Ac_3$. And then, a frequency in the induction heating is determined in accordance with a relationship between the frequency (kHz) and the heating depth d (mm), which relationship is as follow, $d=(250/f)^{1/2}$.

Here, if heating in the first quench-hardening step S11 is carried out by means of an apparatus for induction heating, a frequency in the second quench-hardening step S12 may be identical to the frequency in the first quench-hardening step S11. In this case, the so-called "heating depth" being necessary can be attained by adjustment of heating time, current density, and so on.

By subjecting only the outer circumferential surface region 31 of the pin 3 to the induction heating, a temperature gradient generates to the region from the outer circumferential surface 31$f$ of the pin 3 to the core 32 thereof. Temperature on the outer circumferential surface region is not lower than the transformation temperature $Ac_3$, but the temperature falls toward the core, that is, inward in the radial direction of the pin. Temperature in a region of the outer circumferential surface region 31, on a side of the pin, in close proximity of the core, will be in a range of 400 to 700° C. (corresponding to a high-temperature tempering temperature), and temperature in a region of the outer circumferential surface region 31, on a side of the pin, adjacent to the core (further inward in the radial direction of the pin), will be in a range of 150 to 250° C. (corresponding to low-temperature tempering temperature).

Upon the outer circumferential surface region 31 of the pin 3 having reached the temperature not lower than the transformation temperature $Ac_3$ as a result of heating, the heating is stopped, and the pin 3 is taken out of the induction heater (not shown), in which a cooling of the pin 3 for quench-hardening is started by use of the cooling unit (not shown) of the apparatus for local quench-hardening 30 in a stage before the temperature of the outer circumferential surface 31$f$ of the pin 3 falls down to the transformation temperature $Ar_a$.

As previously described, in the case of the medium-carbon alloy steel, the transformation temperature $Ar_3$ thereof is a temperature lower by about 100° C. than the transformation temperature $Ac_3$.

In the high-frequency induction hardening step (the second quench-hardening step S12) as well, water is preferably used as a coolant (cooling means) in consideration of the cost aspect, and the environmental impact aspect, as is the case with the first quench-hardening step S11. However, for the coolant, use may be made of a water-soluble coolant, oil, and so on.

In the high-frequency induction hardening step (the second quench-hardening step S12), the outer circumferential surface region 31 of the pin 3 is subjected to quench-hardening again.

Further, a region of the core 32 of the pin 3, in close proximity of the outer circumferential surface region 31, is heated to the temperature in the range of 400 to 700° C. upon application of the high-frequency induction hardening, so that high-temperature tempering is carried out thereto.

Furthermore, a region of the core 32 of the pin 3, on a side thereof, adjacent to the center of the core 32, (further inward in the radial direction of the pin), is heated to the temperature in the range of 150 to 250° C. upon application of the high-frequency induction hardening, so that low-temperature tempering is carried out thereto.

In contrast to the above, in the prior art described with reference to FIGS. 17 to 20 (the prior art in which the first step of thermal refining, that is, a quench-hardening, the second step of thermal refining, that is, high-temperature tempering, the high-frequency induction hardening, and the low-temperature tempering are carried out), a second step of thermal refining, that is, high-temperature tempering (refer to FIG. 18) has already been carried out between the first quench-hardening step S11 and the high-frequency induction hardening step (the second quench-hardening step S12) in the first embodiment of the present invention. Accordingly, in the step of the high-frequency induction hardening shown in FIG. 19 (a step corresponds to the second quench-hardening step S12 in the method according to the present invention) of the prior art described with reference to FIGS. 17 to 20, a tempering is not carried out to the core 32.

In other words, in the prior art described with reference to FIGS. 17 to 20 (the prior art comprises the first step of thermal refining, that is, a quench-hardening, the second step of thermal refining, that is, high-temperature tempering, the high-frequency induction hardening, and the low-temperature tempering, are carried out), the high-frequency induction hardening is carried out merely to the outer circumferential surface region. Reversely, in the high-frequency induction hardening step (the second quench-hardening step) S12 of the method according to the first embodiment of the present invention, three kinds of heat treatments are carried out concurrently. More specifically, said three kinds of heat treatments are the high-frequency induction hardening to the outer circumferential surface region 31, the high-temperature tempering in the region (the region outward from the core in the radius direction of the pin) which is the region from the core 32 to the outer circumferential surface region 31, and the low-temperature tempering in the core side region (the region inward to the core in the radius direction of the pin) which is the region near the center axis.

In the first embodiment of the present invention, after the high-frequency induction hardening step (the second quench-hardening step S12), the pin 3 is carried into a low-temperature tempering apparatus 40, by which a low-temperature tempering step (S2) is carried out to the pin 3.

Also, in the low-temperature tempering step (S2), the heating may be carried out either by a heating furnace (a low-temperature tempering furnace), or by an induction heater (not shown).

In a case that the low-temperature tempering is carried out within the heating furnace, the heating is carried out in the range of 150 to 250° C. In such the case, electricity, or a fossil fuel, such as heavy oil, light oil, kerosene, and so on, is used as a heating source (energy).

On the other hand, in the case that the low-temperature tempering step S2 is carried out by the induction heater, since the induction heating is a kind of rapid heating, a heating temperature will be slightly higher than a heating temperature of the heating furnace used in the foregoing case. It is necessary to select a frequency of an alternative current generated by an apparatus for induction heating (not shown), in accordance with the relationship between the frequency (kHz) and the heating depth d (mm) which relationship is indicated by a formula "$d=(250/f)^{1/2}$", so as to heat at least the outer circumferential surface region 31 of the pin 3 to the low-temperature tempering temperature.

For cooling after the heating, a natural cooling may be carried out. Otherwise, the low-temperature tempering apparatus 40 may be provided with a cooling unit in order to carry out a forced cooling.

Thus, the heat treatment of the pin 3 is completed.

Operations of the first embodiment are described hereinafter with reference to FIGS. 2 to 7.

As clearly shown in FIG. 2, in contrast to the prior art, in the method according to the first embodiment of the present invention, the step of the high-temperature tempering of the columnar work is omitted (eliminated). That is, in the method for heat treatment of a columnar work according to the first embodiment of the present invention, numbers of steps being necessary in the heat treatment process are reduced to "three". In the prior art, it is considers that four steps are necessary in the heat treatment process.

Such the reduction in the numbers of the steps not only introduces to cut down the time being necessary for manufacturing the columnar work, but also eliminates thermal energy being consumed in the second step of thermal refining, that is, the high-temperature tempering, so that a manufacturing cost will be reduced substantially.

In FIGS. 3 to 5, respectively, the horizontal axis indicates a distance from the outer circumferential surface of the pin to a position of the center thereof, and the vertical axis indicates hardness, thereby showing hardness distribution in the cross section of the pin. In FIGS. 3 to 5, respectively, the left-hand end in the figure indicates the outer circumferential surface while the right-hand end in the figure indicates the center of the pin.

FIGS. 3 to 5 indicate respectively the hardness distribution in the cross section of the pin in the method according to the first embodiment of the present invention, in which FIG. 3 shows hardness distribution after quench-hardening of the pin in whole (the first quench-hardening step), FIG. 4 shows hardness distribution after quench-hardening of the surface region (the second quench-hardening step), that is, after "high-frequency induction hardening+tempering" shown in FIG. 2, and FIG. 5 shows hardness distribution after "low-temperature tempering".

As for hardness distribution in the cross section of the pin after the low-temperature tempering step in the case of the prior art (the prior art shown in the lower row of FIG. 2: the prior art described with reference to FIGS. 17 to 20), a hardness in a region between a boundary B2 (a position at which a hardness decreases sharply) and the center of the pin is on the order HRC 30 (refer to FIG. 20). In contrast to the above, in the method according to the first embodiment of the present invention (refer to FIG. 5), hardness in a region between a boundary B1 (a part of the pin, at which a hardness decreases sharply) and the outer circumferential surface region 31, and the center of the pin, in the core 32 (T in FIG. 2: low-temperature tempered case), is found in about HRC 32 to 40, showing evidently higher hardness.

Similarly, as for hardness distribution (refer to FIGS. 19, 20) in the cross section of the pin after the quench-hardening to the surface region ("high-frequency induction hardening" in FIG. 2) in the prior art, a hardness in the region between the boundary B2 (the part of the pin, at which a hardness decreases sharply) and the center of the pin is on the order HRC 30. In contrast to the above, in the method according to the first embodiment of the present invention, a hardness distribution (refer to FIGS. 4, 5) in the cross section of the pin after the quench-hardening to the surface region by the high-frequency induction hardening ("high-frequency induction hardening+tempering" shown in FIG. 2), the hardness in the region between the boundary B1 (the part of the pin, at which a hardness decreases sharply) and the center of the pin is found in about HRC 32 to 40, that is, the region has turned harder as compared with the prior art.

Here, the region between the boundary (the part of the pin, at which a hardness decreases sharply: the region "B1" in FIGS. 4, 5, the region "B2" in FIGS. 19, 20) of the outer circumferential surface region 31 and the center of the pin is also a region in which a maximum shearing stress will generates due to a load imposed on the pin 3. An increase in hardness in such a region means an increase in strength against the maximum shearing stress. In other words, the pin 3 manufactured by the method according to the first embodiment of the present invention is hard to be broken in case that an excessive shearing stress is imposed thereon, as compared with the case of the prior art.

Further, according to the first embodiment of the present invention, it is not necessary to select a raw material high in hardenability in order to secure hardness required of the core (the hardness of the core portion), and thereby, an expensive raw material is not necessary, so that it is possible to reduce a cost associated with raw material acquisition.

Herein, reference numeral "Q", shown in the column of the high-frequency induction hardening of FIG. 2, indicates a quench-hardened surface layer of the work (the outer periphery of the work) formed by the high-frequency induction hardening.

FIG. 6 shows results of measurements on residual stress on the surface of the pin 3 manufactured by the method according to the first embodiment of the present invention, as compared with the case of a pin manufactured by the method according to the prior art. In FIG. 6, the horizontal axis indicates measured values of residual stress in a circumferential direction of a pin, and the vertical axis indicates measured values of residual stress in an axial direction of a pin. Herein, a negative value signifies compression stress. Accordingly, the larger the absolute value thereof is, the larger a compressive residual stress is.

As is evident from FIG. 6, in the case of the pin manufactured by the method according to the first embodiment of the present invention, the compressive residual stress on the surface of the pin, in the circumferential direction, remained the same in magnitude as that for the pin manufactured by the prior art, but the compressive residual stress on the surface of the pin, in the axial direction, increased, as compared with that for the pin manufactured by the prior art. That is, there is exhibited an operation effect that in the case of the pin manufactured by the method according to the first embodiment, the compressive residual stress, in the axial direction, will increase.

An increase in the compressive residual stress on the outer circumferential surface of the pin can produce an effect equivalent to an effect gained when shot peening, shot blasting, and so on are carried out to the outer circumferential surface 31f of the pin 3.

Accordingly, even if an excessive load imposes on the pin 3, causing tensile stress to generate on the surface thereof, the tensile stress will decrease by an increased amount of the compressive residual stress, as compared with the case of the pin manufactured by the prior art.

FIG. 7 shows results of a bend test conducted on the pin 3 manufactured by the method according to the first embodiment of the present invention, as compared with the case of the pin manufactured by the prior art. In FIG. 7, the horizontal axis indicates a maximum value of deflection, and the vertical axis indicates a maximum value of bending load.

As is evident from FIG. 7, bend characteristic (bending load in FIG. 7) of the pin manufactured by the method according to the first embodiment is found higher as compared with the case of the pin manufactured by the prior art.

As is evident from FIGS. 6, and 7, in the method according to the first embodiment, a raw material of the pin can be altered to a lower-priced one, or if the pin is made of a raw material identical in strength to the one manufactured by the prior art, miniaturization of the pin can be realized.

In the method according to the first embodiment of the present invention, if induction heating is adopted for heating in the first quench-hardening step S11, the so-called "continuous quench-hardening steps conducted in an integrated line" can be realized because heating in the second quench-hardening step S12 is also induction heating, although not specifically shown in the figure.

Otherwise, if a heating within a furnace is adopted for heating in the first quench-hardening step S11, this will enable energy supply to be reduced as compared with the case of using the induction heater, thereby reducing a heating cost of the first quench-hardening step S11.

Next, a second embodiment of the present invention is described hereinafter with reference to FIGS. 8 to 12.

In the second embodiment as well, heat treatment is carried out to a pin as a constructional part of the endless track 10 (refer to FIG. 13) for use in, for example, the construction vehicle, such as an excavator, bulldozer, and so on.

In a method according to the second embodiment as well, a large-sized pin as large as 50 mm or more in diameter is cited by way of example, however, the method according to the second embodiment is applicable to a small-sized pin, and a medium-sized pin, as well.

In the method according to the second embodiment of the present invention, a large-sized pin 3 is manufactured according to steps of a flow sheet shown in FIG. 8, after completion of machining.

FIG. 9 shows the method according to the second embodiment of the present invention in comparison with the prior art (the prior art in which the first step of thermal refining, that is, a quench-hardening, the second step of thermal refining, that is, high-temperature tempering, the high-frequency induction hardening, and the low temperature tempering are carried out) described with reference to FIGS. 17 to 20.

In FIG. 9, there are schematically shown metallic microstructures of the pin, in cross section, in respective steps (manufacturing processes) of the method according to the second embodiment of the present invention in comparison with the metallic microstructures of the pin, in cross section, according to the prior art described with reference to FIGS. 17 to 20.

Furthermore, referring to FIGS. 10 to 12, and FIGS. 17 to 20, it is intended in FIG. 9 that a cross-sectional hardness distribution (refer to FIGS. 10 to 12) in the respective steps (manufacturing processes) of the method according to the second embodiment in comparison with the cross-sectional hardness distribution according to the prior art, described with reference to FIGS. 17 to 20.

In a step indicated by a phrase "machining-completed work" shown in FIG. 8, a machining and so on are carried out to a raw material (bar steel) made of a medium-carbon alloy steel to be formed into a large-sized pin 3. The raw material of the pin 3 is SCM440, and chemical composition (mass %) thereof is shown in FIG. 16 as described with reference to the first embodiment.

Subsequently, the pin 3 is carried into an apparatus for local quench-hardening 20A, in which a first quench-hardening step S11A is carried out to the pin 3. The apparatus for local quench-hardening 20A is provided with a heating means (a heating furnace or an induction heater) and a cooling unit (not shown in the drawings).

First, a portion of the pin 3 (a region thereof being from the outer circumferential surface 31f to the core 32, shown in FIG. 15) is heated to a temperature not lower than a transformation temperature $Ac_3$ by the heating means of the apparatus for local quench-hardening 20A.

Heating (heating for local: partial heating) by the apparatus for local quench-hardening 20A may be carried out by an induction heating, or such the heating may be carried out by the heating furnace. In the case that the heating is carried out within the heating furnace, a fossil fuel such as heavy oil, light oil, kerosene, and so on, or electricity is used as a heating source (energy).

Herein, a thickness of "the portion of the pin 3 (the partial region being from the outer circumferential surface 31f to the core 32, shown in FIG. 15)" is larger than a thickness of the region being from the outer circumferential surface 31f to "the position having the effective hardness 31ff (refer to FIG. 15)", and "the portion of the pin 3" includes a region near a position at which a maximum shearing stress in the cross section of the pin generates.

Further, as previously described, "the depth of the layer having a hardness not less than the effective hardness t" is "the thickness (depth: a dimension in the radial direction) of an layer having a hardness not less than the effective hardness", and is a distance from the outer circumferential surface 31f of the columnar work 3 to the position having the effective hardness 31ff, in the radial direction of the work 3, as shown in FIG. 15. Further, "the layer having a hardness not less than the effective hardness" is a region (scope) a hardness of which will be not less than an effective hardness after the second quench-hardening step is carried out. And "the effective hardness" means to a hardness of a work which is deemed to be hardened (quench-hardened). In the method according to the present invention, "the hardness of 80% martensite (HRC 45)" is deemed to represent the hardness due to quench-hardening. "The position having the effective hardness 31ff" refers to the position at which a hardness thereof is the effective hardness (HRC 45).

Phrases "The portion of the pin 3" or "the partial region being from the outer circumferential surface 31f to the core 32" means to a region being from the outer circumferential surface 31f toward the core 32 in the radial direction of the pin, a thickness of which region is, for example, not more than ¾ of the radius of the pin 3. Preferably, the thickness of such the region is not less than ⅓ of the radius of the pin 3, from the outer circumferential surface 31f toward the core 32, in the radial direction of the pin. More specifically, assuming that a radius (the distance between the outer circumferential surface 31f and the core 32 inclusive) of the pin 3 is indicated by a character "R", and a depth of "the portion of the pin 3" in the radial direction (a depth from the outer circumferential surface 31f toward the core 32) is indicated by a character "rr", which portion is heated to a temperature not lower than the transformation temperature $Ac_3$ in the first quench-hardening step S11A, it is preferably that the following formula is satisfied:

$$\frac{1}{3} \leq rr/R \leq \frac{3}{4}$$

A transformation temperature $Ac_3$ (a specific temperature) of a work is dependent on a chemical composition of the work, as described in the first embodiment. In the case that the heating is carried out within the heating furnace, the transformation temperature $Ac_3$ of a medium-carbon alloy steel is on the order of approximately 800° C. (780 to 820° C.). In the case that the induction heating (rapid heating) is carried out (not shown in drawings), a transformation temperature $Ac_3$ of the medium-carbon alloy steel will be higher by about 100° C. than the transformation temperature $Ac_3$ in the aforementioned case.

In the case that the heating in the first quench-hardening step S11A is carried out by the apparatus for induction heating, it is necessary to select a frequency of an electric generator (an apparatus for induction heating), such that the portion of the pin 3 (a part of the entire region of the work being from the outer circumferential surface 31f to the core 32 in the radial direction) will be heated to a temperature not lower than the transformation temperature $Ac_3$.

As described with reference to the first embodiment, there is the relationship between frequency f (kHz) and the heating depth d (mm) as follows:

$$d = (250/f)^{1/2}$$

It is possible to heat such the portion of the pin 3 to the temperature not lower than the transformation temperature $Ac_3$ in the first quench-hardening step S11A by setting the frequency f appropriately in accordance with the above-mentioned relationship, and to control a heating depth intentionally.

Upon completion of the heating of the portion of the pin to the temperature not lower than the transformation temperature $Ac_3$ by means of the apparatus for local quench-hardening 20A, the heating is stopped, and cooling of the pin 3 for quench-hardening is started by means of the cooling unit (not shown) of the apparatus for local quench-hardening 20A, before the temperature of the outer circumferential surface 31f of the work descends to the transformation temperature $Ar_3$. In the case of a medium-carbon alloy steel, the transformation temperature $Ar_3$ thereof will be a temperature lower by about 100° C. than the transformation temperature $Ac_3$. As described with reference to the first embodiment, a coolant for a quench-hardening includes water, a water-soluble coolant, oil, and so on. In consideration of the cost aspect, and the environmental impact aspect, water is preferably as the coolant.

When the quench-hardening is carried out to the portion of the pin 3 by the apparatus for local quench-hardening 20A, thereby completing the first quench-hardening step S11A, the pin 3 is carried into a apparatus for local quench-hardening 30. The apparatus for local quench-hardening 30 is made up similarly to the apparatus for local quench-hardening 30 used in the first embodiment, being provided with an induction heater, and a cooling unit although not specifically shown in the figure. Then, the high-frequency induction hardening step (the second quench-hardening step) S12 is carried out to the pin 3.

In the high-frequency induction hardening step (the second quench-hardening step) S12, induction heating to a temperature not lower than the transformation temperature $Ac_3$ is carried out to only the outer circumferential surface region 31 of the pin 3, subjected to the partial quench-hardening in the first quench-hardening step S11A. In other words, while the partial region of the cross section of the pin 3 (the region corresponding to, for example, not more than ¾ of the distance from the outer circumferential surface 31f toward the core 32, in the radial direction) is heated to the temperature not lower than the transformation temperature $Ac_3$ in the first quench-hardening step S11A, only the outer circumferential surface region 31 of the pin 3 is heated to the temperature not lower than the transformation temperature $Ac_3$ in the second quench-hardening step S12.

In the method according to the second embodiment of the present invention, the heating in the first quench-hardening step S11A and the heating in the second quench-hardening step S12 are the same in an aspect that the entire region of the cross section of the pin 3 is not heated, in other words, the local heating (so-called "partial heating") is carried out. For heating in the first quench-hardening step S11A, the region, for example, a thickness of which region is not more than ¾ of the radius of the pin from the outer circumferential surface 31f toward the core 32 in the radial direction, is heated to the temperature not lower than the transformation temperature $Ac_3$ in the first quench-hardening step S11A. However, in the second quench-hardening step S12, merely the outer circumferential surface region 31 is heated to the temperature not lower than the transformation temperature $Ac_3$. In order to effect heating of the outer circumferential surface region 31 merely, the heating in the second quench-hardening step S12 has to rely on an induction heating (an induction heating by means of, for example, a high-frequency induction power supply).

In this connection, "the outer circumferential surface region 31" refers to the region including not only the outer circumferential surface 31f of the pin 3 but also the region near the outer circumferential surface 31f as shown in FIG. 15, and "the outer circumferential surface region 31" is a region a thickness of which is the given depth t (the depth of the layer having a hardness not less than the effective hardness), as described with reference to the first embodiment.

Further, explanations of "the depth of the layer having a hardness not less than the effective hardness t", "the thickness of the layer having a hardness not less than the effective hardness (depth: the dimension in the radial direction)", "the layer having a hardness not less than the effective hardness" "the effective hardness", and "the position having the effective hardness 31f''", are the same as the explanations described in the first embodiment, respectively.

In the method according to the second embodiment of the present invention, if heating in the first quench-hardening step S11A is effected with the use of the induction heater, frequency identical to that of the induction heater employed in the first quench-hardening step S11A may be used for frequency of the induction heater employed in the second quench-hardening step S12. In this case, a necessary heating depth is obtained by adjustment of heating time, current density, and so on.

In the prior art described with reference to FIGS. 17 to 20 (the prior art in which the first step of thermal refining, that is, a quench-hardening, the second step of thermal refining, that is, high-temperature tempering, the high-frequency induction hardening, and the low-temperature tempering are carried out), the high-frequency induction hardening is merely carried out to the outer circumferential surface region. Reversely, in the high-frequency induction hardening step (the second quench-hardening step) S12 of the method according to the second embodiment, the three kinds of heat treatments are concurrently carried out. More specifically, such the three kinds of heat treatments are the high-frequency induction hardening on the outer circumferential surface region 31, the high-temperature tempering in the region of the core 32 which region includes a portion being from the core 32 to the outward side toward the outer circumferential surface region 31 in the radial direction (outward in the radial direction of the pin), and the low-temperature tempering in the region of the core 32 which region is a center of the core 32 (inward in the radial direction of the pin), respectively.

The second quench-hardening step S12 of the method according to the second embodiment is the same as the second quench-hardening step S12 of the method according to the first embodiment.

After completion of the high-frequency induction hardening step (the second quench-hardening step S12), the pin 3 is carried into a low-temperature tempering apparatus 40, in which a low-temperature tempering step (S2) is carried out to the pin 3.

The low-temperature tempering step S2 of the pin 3 of the method according to the second embodiment of the present invention is the same as the low-temperature tempering step S2 of the method according to the first embodiment of the present invention.

Thus, the heat treatment of the pin 3 is completed.

Now, operations of the second embodiment of the present invention are described hereinafter with reference to FIGS. 9 to 12. As clearly shown in FIG. 9, in contrast to the prior art, in the method according to the second embodiment of the present invention, the second step of thermal refining, that is, the high-temperature tempering of the columnar work is omitted (eliminated). More specifically, in the method for heat treatment of a columnar work according to the second embodiment of the present invention, the number of steps being necessary in the heat treatment process is reduced to "three", in contrast to the prior art in which four steps are necessary in the heat treatment process.

Such reduction in the number of the steps not only introduces to cut down time necessary for manufacturing the columnar work, but also eliminates the need for thermal energy being consumed in the second step of the thermal refining, that is, the high-temperature tempering, so that a manufacturing cost is substantially reduced.

In FIGS. 10 to 12, respectively, the horizontal axis indicates a distance from the outer circumferential surface of the pin to a position of the center thereof, and the vertical axis indicates hardness, thereby showing hardness distribution in the cross section of the pin. In FIGS. 10 to 12, respectively, the left-hand end in the figure indicates the outer circumferential surface while the right-hand end in the figure indicates the center of the pin.

FIG. 10 shows hardness distribution in the cross section of the pin 3 in a stage upon completion of the first quench-hardening step S11A. In the method according to the present invention, a region corresponding to not more than ½ of the distance from the outer circumferential surface 31f toward the core 32, in the radial direction of the pin, is heated to a temperature not lower than the transformation temperature $Ac_3$.

It is found from FIG. 10 that hardness underwent a sharp decrease at a position corresponding to ½ of the distance from the outer circumferential surface 31f toward the core 32, in the radial direction of the pin, in the stage upon the completion of the first quench-hardening step S11A.

FIG. 11 shows hardness distribution in the cross section of the pin 3 in a stage when the first quench-hardening step S11A is completed, and only the outer circumferential surface region 31 of the pin 3 is heated to a temperature not lower than the transformation temperature $Ac_3$ before rapid cooling is carried out thereto, that is, in a stage upon completion of the second quench-hardening step S12.

It is found from FIG. 11 that hardness underwent a sharp decrease at a position in excess of a given depth (including the depth of the layer having a hardness not less than the effective hardness t), having undergone a further sharp decrease at the position corresponding to ½ of the distance from the outer circumferential surface 31f toward the core 32, in the radial direction of the pin.

FIG. 12 shows hardness distribution in the cross section of the pin 3 in a stage upon completion of the low-temperature tempering step S2. As is the case with the hardness distribution shown in FIG. 11, it is found in FIG. 12 that hardness underwent a sharp decrease at a position in excess of the given depth (including the depth of the layer having a hardness not less than the effective hardness t), having undergone a further sharp decrease at the position corresponding to ½ of the distance from the outer circumferential surface 31f toward the core 32, in the radial direction of the pin.

Now, a region between a position indicated by reference numeral C1 in FIG. 12, and the outer circumferential surface 31f includes a region at which a maximum shearing stress will generate due to a load imposed on the pin 3. As clearly shown in FIG. 12, the lowest value of hardness in such a region (hardness at a position indicated by the reference numeral B1 in FIG. 12) will be higher as compared with the hardness of the core (refer to FIG. 20) according to the prior art, and therefore, a strength against the maximum shearing stress is increased in the second embodiment. In other words, the pin 3 manufactured by the method according to the second embodiment is hard to be broken in a case that an excessive shearing stress is imposed thereon.

Further, it is not necessity to select a raw material being high in hardenability in order to secure hardness required of the core (the hardness of the core portion), it is not necessary to select an expensive raw material, and therefore, it is possible to reduce a cost associated with raw material acquisition.

Furthermore, reference numeral Q of "high-frequency induction hardening" shown in FIG. 9 indicates a quench-hardened surface layer of the work (an outer periphery of the work) formed by the high-frequency induction hardening.

As clearly shown in FIG. 12, in the pin 3 manufactured by the method according to the present invention, the region between the position indicated by the reference numeral C1 in FIG. 12 and the outer circumferential surface 31f is the region in which the maximum shearing stress generates due to a load imposed on the pin 3.

The residual stress on the surface of the pin 3 manufactured by the method according to the second embodiment of the present invention exhibits the same characteristic as that of the residual stress on the surface of the pin 3 manufactured by the method according to the first embodiment (refer to FIG. 6). And the compressive residual stress in the circumferential direction on the surface of the pin being manufactured by the method according to the second embodiment of the present invention is generally the same as such the compressive residual stress in the circumferential direction for the pin being manufactured by the prior art. However, in the axial direction, the compressive residual stress on the surface of the pin being manufactured by the method according to the second embodiment of the present invention is increased, as compared with the pin being manufactured by the prior art. That is, in the case of the pin manufactured by the method according to the second embodiment, as well as the first embodiment, there is an improvement in the operation effect that the compressive residual stress in the axial direction thereof increases.

Accordingly, in the pin 3 manufactured by the second embodiment, in a case that an excessive load is imposed on the pin 3 and a tensile stress is generated on the surface thereof, the tensile stress will decrease by an increase of the compressive residual stress in the pin of the second embodiment as compared with the pin manufactured by the prior art.

Results of a bend test conducted on the pin 3 manufactured by the method according to the second embodiment of the present invention show the same characteristic as that of the pin manufactured by the method according to the first embodiment (refer to FIG. 7).

As is evident from the results of the bend test, in the method according to the second embodiment of the present invention, as well, a raw material for a pin can be altered to a lower-priced one, or if use is made of a raw material identical in strength to the one being manufactured by the prior art, miniaturization of the pin can be realized.

In the method according to the second embodiment of the present invention, as well, if heating in the first quench-hardening step S11A is induction heating, heating in the second quench-hardening step S12 as well will be induction heating, although not specifically shown in the figure, so that the so-called "continuous quench-hardening steps conducted in an integrated line" can be realized.

Otherwise, if a heating within a furnace is adopted for heating in the first quench-hardening step S11A, this will enable energy supply to be reduced as compared the case of using the induction heater, thereby reducing a heating cost of the first quench-hardening step S11A In addition, in the method according to the second embodiment of the present invention, the partial region of the pin 3, ranging from the outer circumferential surface 31f to the core 32, is heated to the temperature not lower than the transformation temperature $Ac_3$ in the first quench-hardening step S11A to be quench-hardened, instead of heating the entire region of the cross section of the pin 3 to the temperature not lower than the transformation temperature $Ac_3$. Accordingly, it is possible to shorten heating time in the first quench-hardening step S11A as compared with the case of heating the entire region of the cross section of the pin 3 to the temperature not lower than the transformation temperature $Ac_3$, thereby saving energy consumed for heating.

Now, it is to be pointed out that the respective embodiments shown in the accompanying drawings are illustrative, and that the technical scope of the present invention be not limited thereto.

For example, in the respective embodiments shown in the accompanying drawings, explanation is given by citing the pin 3 of the endless track 10 for use in the construction vehicle by way of example, however, the present invention is obviously applicable to small-sized and medium-sized pins as well. Furthermore, the present invention is also applicable to heat treatment of a columnar work other than the pin of the endless track.

BRIEF DESCRIPTION OF THE DRAWINGS

FIG. 1 is a flow sheet of heat treatment carried out to a columnar work, according to a first embodiment of the present invention.

FIG. 3 is a view showing hardness distribution in the cross section of the pin to which a first quench-hardening step of the method according to the first embodiment of the present invention is carried out.

FIG. 4 is a view showing hardness distribution in the cross section of the pin to which a second quench-hardening step of the method according to the first embodiment of the present invention is carried out.

FIG. 5 is a view showing hardness distribution in the cross section of the pin to which a low-temperature tempering step of the method according to the first embodiment of the present invention is carried out.

FIG. 6 is a view showing results of measurements on residual stress on the surface of the pin manufactured by the method according to the first embodiment of the present invention, after heat treatment, as compared with the case of a pin manufactured by the method according to the prior art.

FIG. 7 is a view showing results of a bend test conducted on the pin manufactured by the method according to the first embodiment of the present invention, after heat treatment, as compared with the case of the pin manufactured by the prior art.

FIG. 8 is a flow sheet of heat treatment carried out to a columnar work, according to a second embodiment of the present invention.

FIG. 15 is a perspective view of a pin of the endless track.

FIG. 16 is a view showing a table of chemical composition of a steel raw material for pin as an example for heat treatment by way of example.

EXPLANATION OF REFERENCE NUMERALS AND SYMBOLS

Figure 2:
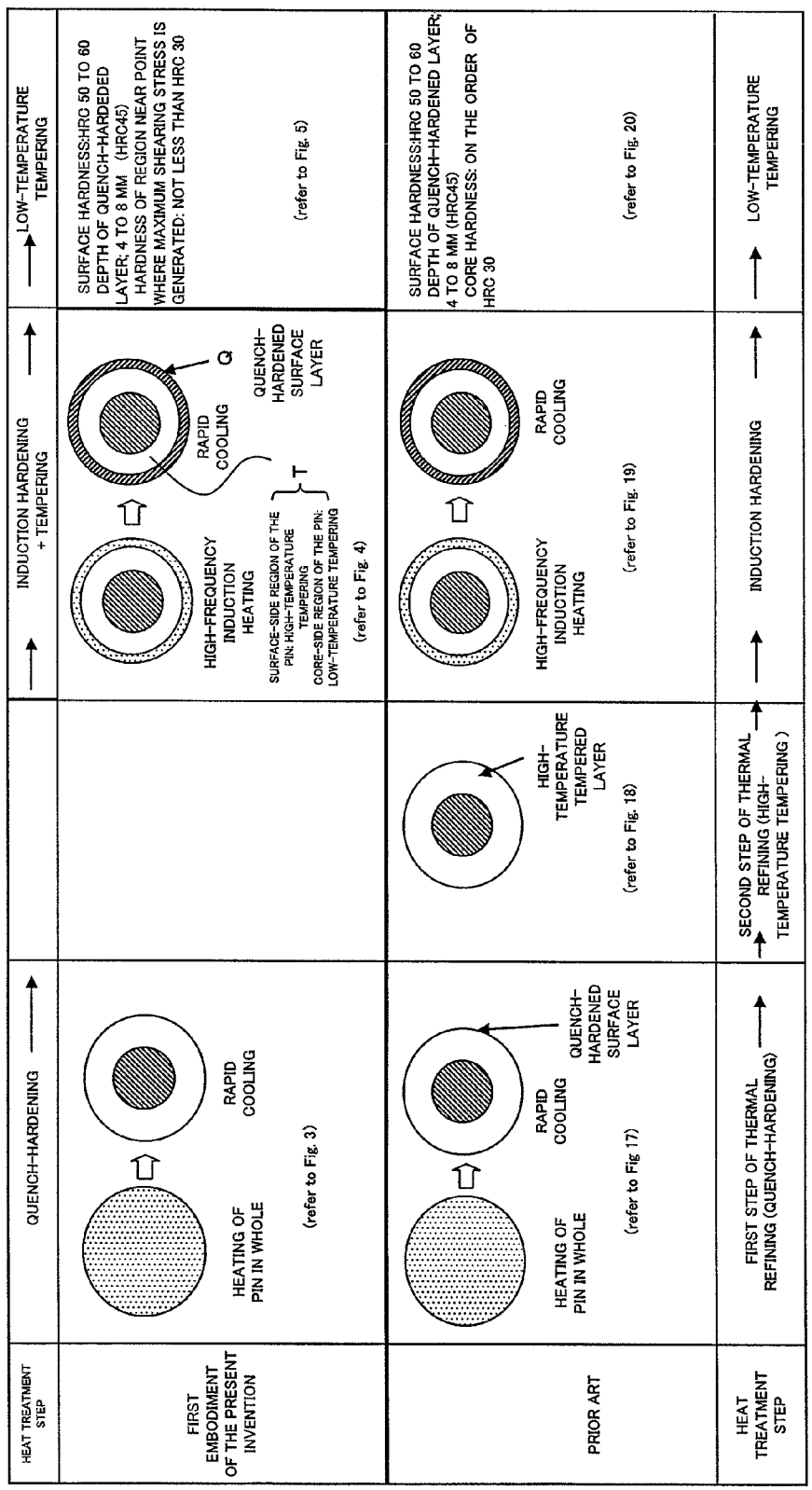
FIG. 2 is a comparison view schematically showing metallic microstructures of a pin, in cross section, and hardness distribution thereof, in respective steps (manufacturing processes) of a method according to the first embodiment of the present invention, as compared with the prior art.
Figure 9:
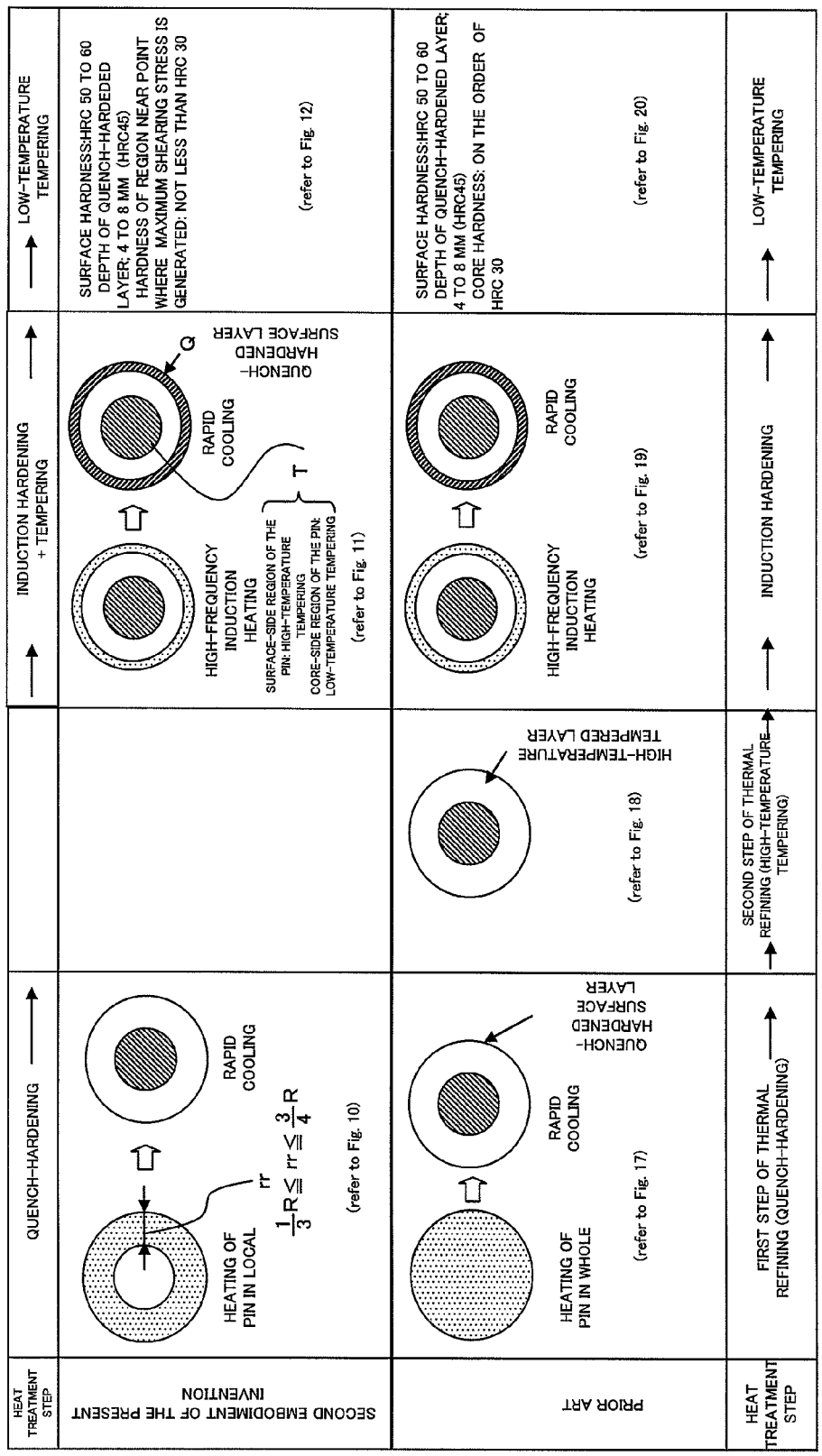
FIG. 9 is a comparison view schematically showing metallic microstructures of a pin, in cross section, and hardness distribution thereof, in respective steps (manufacturing processes) of a method according to the second embodiment of the present invention, as compared with the prior art.
Figure 10:
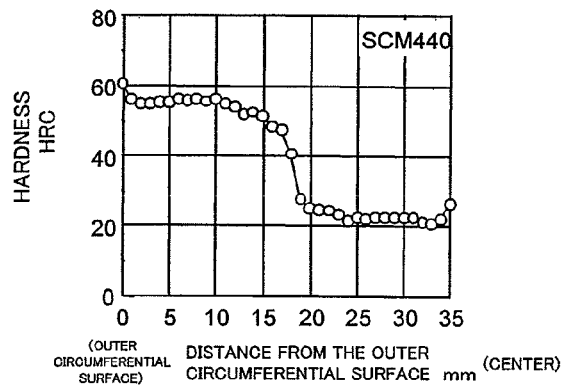
FIG. 10 is a view showing hardness distribution in the cross section of the pin to which the first quench-hardening step of the method according to the second embodiment of the present invention is carried out.
Figure 11:
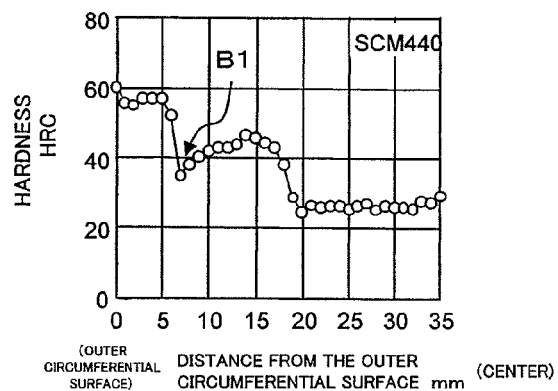
FIG. 11 is a view showing hardness distribution in the cross section of the pin to which the second quench-hardening step of the method according to the second embodiment of the present invention is carried out.
Figure 12:
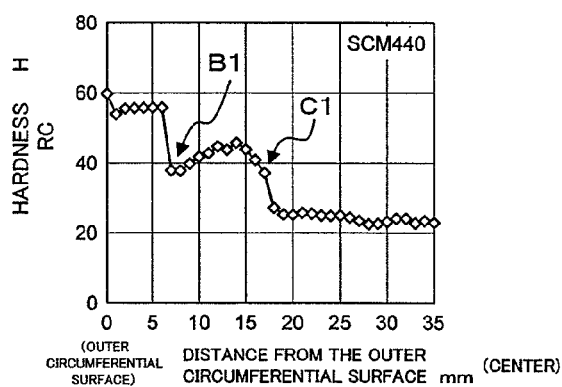
FIG. 12 is a view showing hardness distribution in the cross section of the pin to which a low-temperature tempering step of the method according to the second embodiment of the present invention is carried out.
Figure 13:
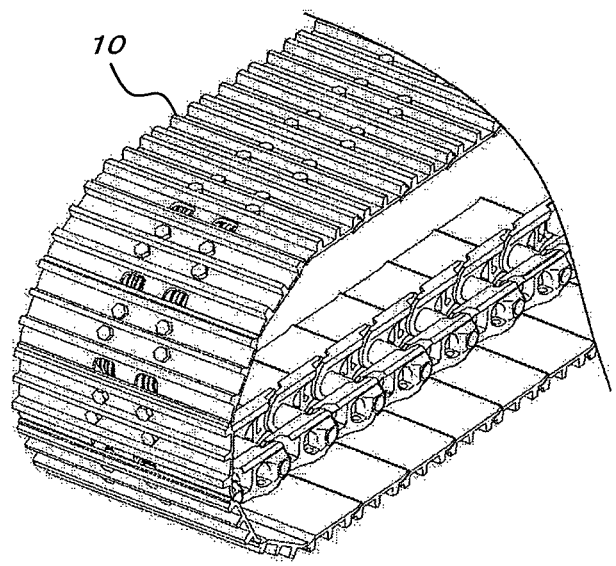
FIG. 13 is a perspective view of an endless track for use in construction vehicle.
Figure 14:
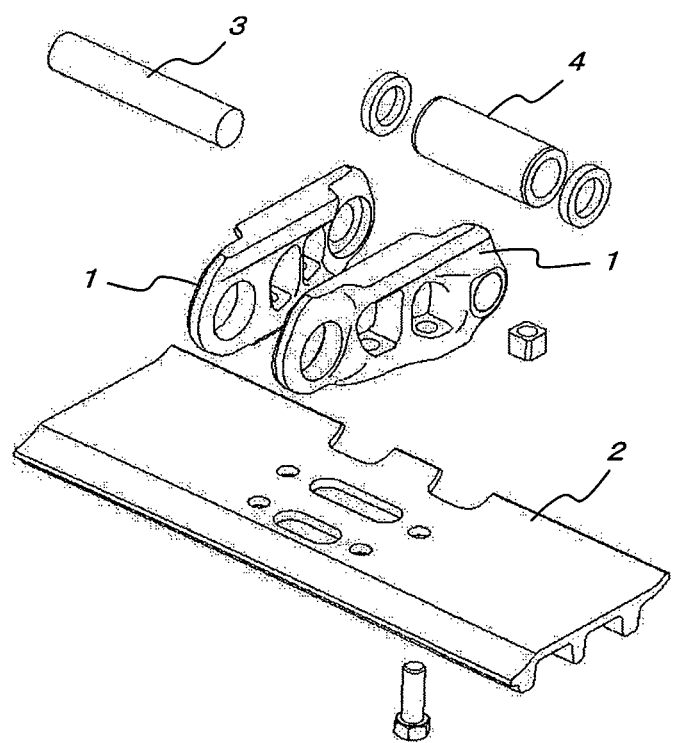
FIG. 14 is an assembly view showing constituent elements of the endless track for use in construction vehicle.
Figure 17:
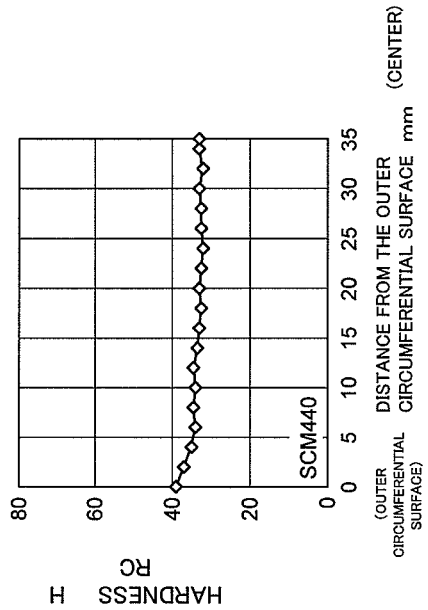
FIG. 17 is a view showing hardness distribution in the cross section of a pin after quench-hardening for thermal refining, according to the prior art.
Figure 18:
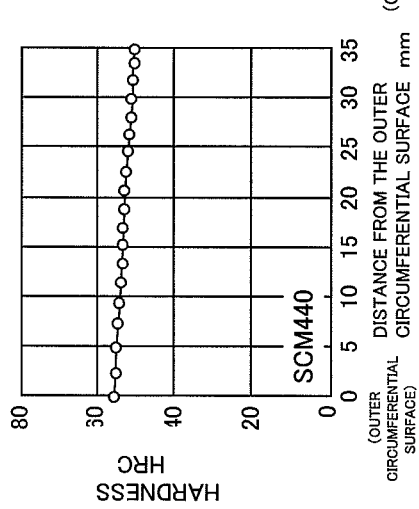
FIG. 18 is a view showing hardness distribution in the cross section of the pin after high-temperature tempering for thermal refining of the pin, according to the prior art.
Figure 19:
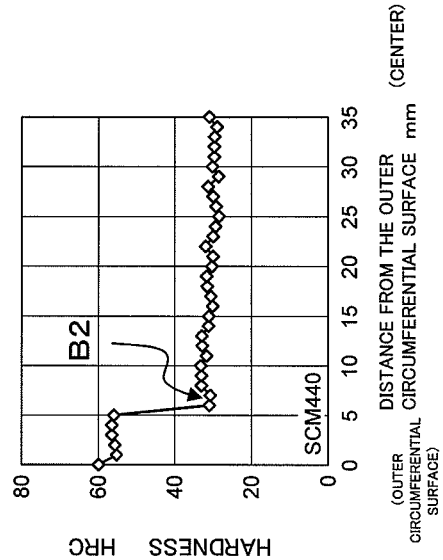
FIG. 19 is a view showing a hardness distribution in the cross section of the pin after the high-frequency induction hardening according to the prior art.
Figure 20:
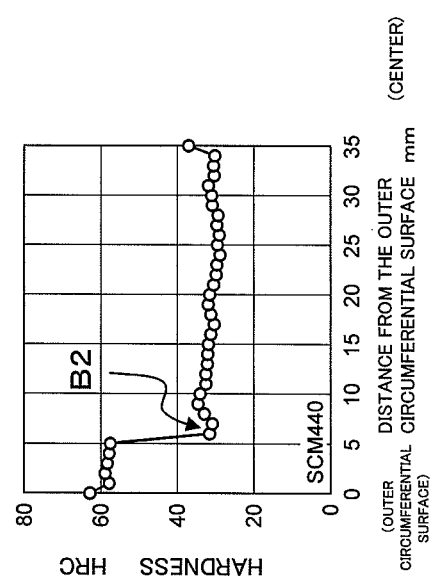
FIG. 20 is a view showing the hardness distribution in the cross section of the pin after the low-temperature tempering according to the prior art.

1 . . . link,
2 . . . shoe,
3 . . . columnar work (pin for use in an endless track)
4 . . . bushing
20 . . . apparatus for whole quench-hardening
30 . . . apparatus for local quench-hardening
31 . . . outer circumferential surface region
31f . . . outer circumferential surface
32 . . . core
40 . . . low-temperature tempering apparatus 40

The invention claimed is:

1. A heat treatment method of a pin for an endless track, in which a heat treatment of the pin for an endless track made of a medium-carbon alloy steel is carried out, the method comprising:
a quench-hardening step and a tempering step being carried out after the quench-hardening step;
the quench-hardening step includes a first quench-hardening step and a second quench-hardening step being carried out after the first quench-hardening step;
the first quench-hardening step is a quench-hardening step in which a partial region in the radius inwardly direction from an outer circumferential surface side of the pin is heated to a temperature not lower than a transformation temperature $Ac_3$, the first quench-hardening step is not a quench-hardening step in which an entire region in the radius inwardly direction from an outer circumferential surface side of the section of the pin is heated to a temperature not lower than a transformation temperature $Ac_3$, and a dimension of the partial region in the radial inwardly direction thereof, which region is heated in the first quench-hardening step, is not less than ⅓ of the radius of the pin and is not more than ¾ of the radius of the pin;
the second quench-hardening step is a quench-hardening step in which the outer circumferential surface region of the pin carried out by the quench-hardening in the first quench-hardening step is merely heated by an induction heating to a temperature not lower than the transformation temperature $Ac_3$, in the second quench-hardening step, a depth of the outer circumferential surface region is not less than 1/10 of a radius of the pin for an endless track, and not more than ½ of the radius of the pin for an endless track;
the tempering step is a step for low-temperature tempering to the pin carried out by the quench-hardening in the quench-hardening step; and that
in a hardness distribution in a cross section of the pin, hardness undergoes a decrease at a first position, corresponding to a location less than ½ of the distance from the outer circumferential surface toward a center of a core in the radial direction of the pin, in the radius inwardly direction from an outer circumferential surface side, and a further decrease at a second position corresponding to ½ of the distance from the outer circumferential surface toward the center of the core in the radial direction of the pin, so as to increase a strength against the maximum shearing stress, a compressive residual stress and a strength for bending load in the pin,
wherein the second position is disposed between the first position and the center of the core.

2. The heat treatment method of a pin for an endless track according to claim 1,
wherein the heating in the first quench-hardening step is an induction heating.

3. The heat treatment method of a pin for an endless track according to claim 1,
wherein the heating in the first quench-hardening step is a heating within a furnace.

* * * * *